(12) United States Patent
Dishman et al.

(10) Patent No.: US 7,724,487 B2
(45) Date of Patent: May 25, 2010

(54) APPARATUS, SYSTEM, AND METHOD FOR LOSSLESS REVERSE VOLTAGE PROTECTION

(75) Inventors: Cecil C. Dishman, Raleigh, NC (US); Randhir S. Malik, Cary, NC (US); Trung M. Nguyen, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 12/171,086

(22) Filed: Jul. 10, 2008

(65) Prior Publication Data

US 2010/0008005 A1    Jan. 14, 2010

(51) Int. Cl.
*H02H 3/00* (2006.01)
*H02H 3/08* (2006.01)
*H02H 9/02* (2006.01)
*H02H 9/08* (2006.01)

(52) U.S. Cl. .......................... 361/82; 361/84; 361/93.1; 361/93.9

(58) Field of Classification Search ................. 361/82, 361/84, 93.1, 93.9; 363/55, 56.01–56.12
See application file for complete search history.

(56) References Cited

U.S. PATENT DOCUMENTS

| 5,982,142 | A |  | 11/1999 | Sullivan et al. |
| 6,867,640 | B2 |  | 3/2005 | Scott et al. |
| 6,882,513 | B2 |  | 4/2005 | Laraia |
| 7,012,793 | B2 | * | 3/2006 | Cheevanantachai et al. ... 361/82 |
| 7,466,573 | B2 | * | 12/2008 | Kojori et al. ................... 363/65 |
| 2008/0160370 | A1 | * | 7/2008 | Masse et al. ................... 429/23 |
| 2009/0152950 | A1 | * | 6/2009 | Zhang et al. ................... 307/43 |

FOREIGN PATENT DOCUMENTS

JP    2001008440    12/2001

* cited by examiner

*Primary Examiner*—Ronald W Leja
*Assistant Examiner*—Dharti H Patel
(74) *Attorney, Agent, or Firm*—Kunzler Needham Massey & Thorpe

(57) ABSTRACT

An apparatus, system, and method are disclosed for preventing reverse current in a switching power supply. An electrical connector receives an input current from an electric source. An input current limiting module substantially prevents the input current from reaching a switching power supply when the input current is flowing in a reverse direction. A voltage reduction module reduces an input voltage of the switching power supply to a switching voltage when the input current is flowing in a forward direction. A switching module closes a switch in response to the voltage reduction module providing the switching voltage. The switch provides the input current a lower impedance path to the switching power supply than does the input current limiting module.

9 Claims, 2 Drawing Sheets

APPARATUS, SYSTEM, AND METHOD FOR LOSSLESS REVERSE VOLTAGE PROTECTION

BACKGROUND OF THE INVENTION

1. Field of the Invention

This invention relates to reverse voltage protection and more particularly relates to lossless reverse voltage protection for power supplies.

2. Description of the Related Art

Many power supplies, sometimes known as power supply units or PSUs, are easily damaged and may become dangerous when a reverse voltage is applied as an input. Some applications, such as telecommunications, use high voltage electric sources for their power supplies, increasing the likelihood of damage, smoke, and fire in the case of a reverse voltage. The input wires or terminals to some power supplies are not marked to differentiate between the positive and the negative input, greatly increasing the chance that a reverse voltage will be accidentally applied. Additionally, even when a forward voltage is applied, in the case of a short circuit within a power supply, damage, smoke, and fire may also occur.

Traditional reverse voltage protection systems include additional electrical components. These components are often costly, and increase the overall cost of the power supply. The components are also inefficient and lossy, dissipating and wasting electrical power. Efficiency and energy conservation are increasingly important goals of both the industry and consumers. A reverse voltage protection system that reduces the cost of components and reduces the electrical inefficiencies of the system would decrease the overall cost of the system as well as reducing energy costs to consumers.

From the foregoing discussion, it should be apparent that a need exists for an apparatus, system, and method that can efficiently protect power supplies from reverse voltages. Beneficially, such an apparatus, system, and method would provide reverse voltage protection that is both cost and energy efficient.

SUMMARY OF THE INVENTION

The present invention has been developed in response to the present state of the art, and in particular, in response to the problems and needs in the art that have not yet been fully solved by currently available reverse voltage protection systems. Accordingly, the present invention has been developed to provide an apparatus, system, and method for providing reverse voltage protection that overcome many or all of the above-discussed shortcomings in the art.

The apparatus for preventing reverse current includes an electrical connector and is provided with a plurality of modules configured to functionally execute the necessary steps of reverse current protection. These modules in the described embodiments include an input current limiting module, a voltage reduction module, a switching module, and a short circuit protection module.

The electrical connector, in one embodiment, receives an input current from an electric source. In one embodiment, the input current limiting module substantially prevents the input current from reaching a switching power supply when the input current is flowing in a reverse direction. The input current limiting module, in a further embodiment, limits the input current to the switching power supply when the input current is flowing in a forward direction.

In another embodiment, the input current limiting module comprises a resistor and a diode. In one embodiment, a first connection of the resistor is connected to the electrical connector and to a first connection of a switch of the switching module and a second connection of the resistor is connected to the anode of the diode, and the cathode of the diode is connected to a switching power supply and to a second connection of the switch of the switching module. In a further embodiment, the input current limiting module is electrically coupled to the electrical connector.

In a further embodiment, the voltage reduction module reduces an input voltage of the switching power supply to a switching voltage when the input current is flowing in a forward direction. In one embodiment, the voltage reduction module comprises a buck converter that receives the input voltage and supplies the switching voltage to the switching voltage. In one embodiment, the switching voltage is lower than the input voltage. In another embodiment, the switching voltage comprises a coil voltage.

In one embodiment, the switching module closes a switch in response to the voltage reduction module providing the switching voltage. The switch provides the input current a lower impedance path to the switching power supply when the switch is closed than does the input current limiting module. In a further embodiment, the switching module comprises a relay with a switch. In one embodiment, the switch of the switching module is coupled to the electrical connector in a parallel configuration with the input current limiting module.

In another embodiment, the short circuit protection module opens the switch in response to an electrical short within the switching power supply. In a further embodiment, the short circuit protection module prevents the buck converter from providing the coil voltage in response to an electrical short within the switching power supply.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
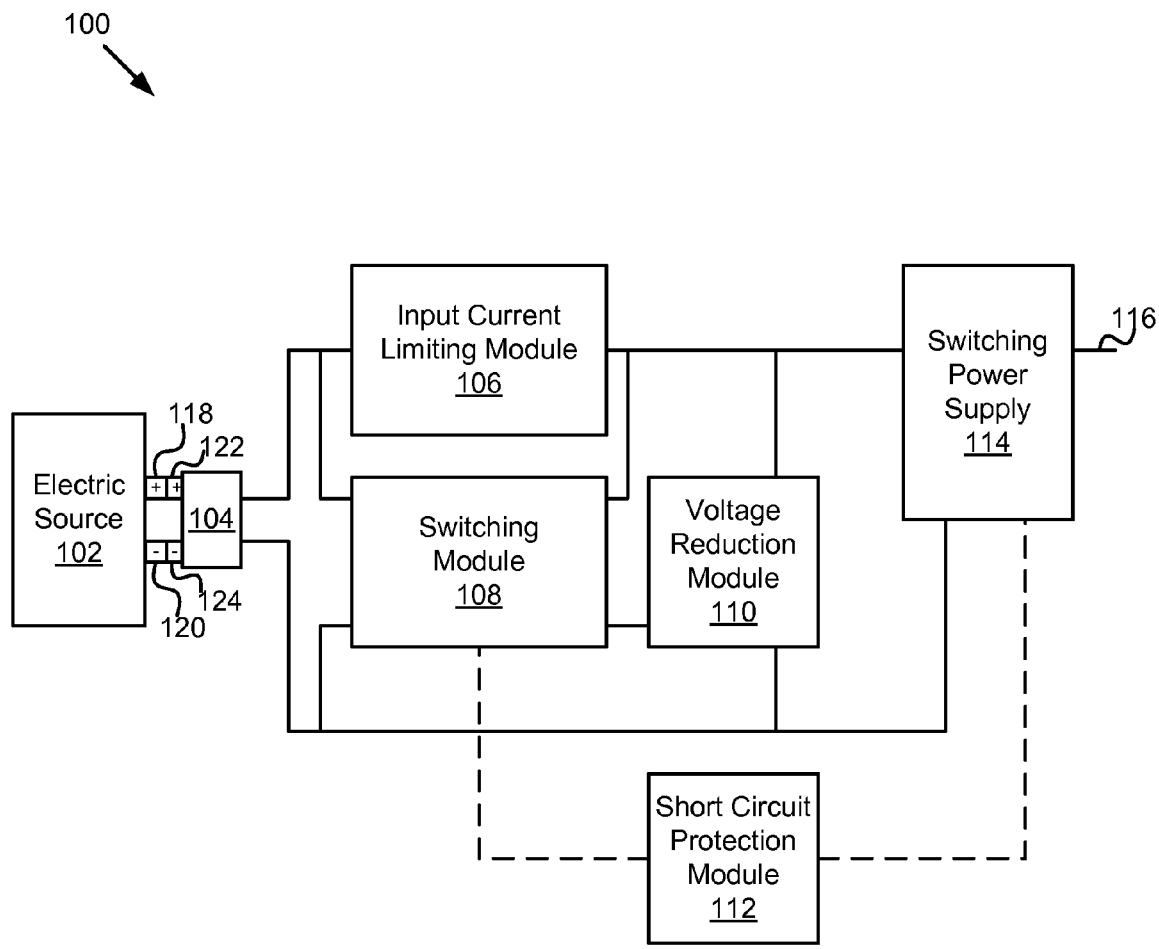
FIG. 1 is a schematic block diagram illustrating one embodiment of a system for providing lossless reverse voltage protection to a power supply in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a system 100 for providing lossless reverse voltage protection to a power supply 116. In one embodiment, the system 100 comprises an electric source 102, an electrical connector 104, an input current limiting module 106, a switching module 108, a voltage reduction module 110, a short circuit protection module 112, a switching power supply 114, and an output 116. In one embodiment, the electrical connector 104, the input current limiting module 106, the switching module 108, the voltage reduction module 110, and the short circuit protection module 112 are included in the switching power supply 114.

In one embodiment, the electric source 102 is a direct current ("DC") electric source. The electric source 102 may comprise a battery, a generator, an electrical outlet, a power supply, or another electric source. The electric source 102, in one embodiment, may comprise a rectifier that converts alternating current ("AC") electric power to DC electric power. In one embodiment, the electric source 102 may comprise a positive connection 118 and a negative connection 120. The positive connection 118 and the negative connection 120 may or may not be distinguishable as such. The positive connection 118 and the negative connection 120 each may comprise a terminal, wire, port, outlet, connector, or another electrical connection. In one embodiment, the electric source 102 comprises a high voltage battery suitable as a source for a telecommunications power supply.

In one embodiment, the electrical connector 104 receives an input current from the electric source 102. The electrical connector 104 may comprise one or more terminals, wires, ports, plugs, clips, twist on wire fasteners, or other connectors that are configured to electrically interface with the electric source 102. The electrical connector 104, in one embodiment, comprises a positive connector 122 and a negative connector 124 configured to interface with the positive connection 118 and the negative connection 120 of the electric source 102. In one embodiment, the input current flows through the electrical connector 104 in a forward direction when the positive connector 122 is connected to the positive connection 118 and the negative connector 124 is connected to the negative connection 120, and the input current flows through the electrical connector 104 in a reverse direction when the positive connector 122 is connected to the negative connection 120 and the negative connector 124 is connected to the positive connection 118.

In one embodiment, the input current limiting module 106 is electrically coupled to the electrical connector 104, and receives the input current from the electrical connector 104. The input current limiting module 106, in a further embodiment, is configured to prevent the input current from reaching the switching power supply 114 when the input current is flowing in a reverse direction, but otherwise to allow the input current to flow through the input current limiting module 106 in a forward direction. In another embodiment, the input current limiting module 106 substantially prevents the flow of current in the reverse direction, and may also provide some impedance to limit the flow of current in the forward direction. In another embodiment, the input current limiting module 106 comprises a resistor to impede the flow of current in the forward direction and a diode to prevent the flow of current in the reverse direction.

In one embodiment, the switching module 108 is electrically coupled to the electrical connector 104, and is in a parallel configuration with the input current limiting module 106. The switching module 108, in another embodiment, is configured to close a switch in response to a switching voltage. In one embodiment, when the switch is closed, the switching module 108 provides the input current a lower impedance path to the switching power supply 114 than the input current limiting module 106 provides. In a further embodiment, the switching module 108 has substantially no impedance and substantially no current flows through the input current limiting module 106 when the switch is closed. The switching module 108, in one embodiment, comprises a relay with a switch and a coil to control opening and closing the switch, and the switching voltage comprises a coil voltage that biases the relay into a closed state. In another embodiment, the switching module 108 comprises a DC powered high current relay.

In one embodiment, the voltage reduction module 110 converts an input voltage of the switching power supply 114 to a switching voltage when the input current is flowing in the forward direction. In a further embodiment, the voltage reduction module 110 is oriented such that it does not receive the input current or receives a small amount of input current when the input current is flowing in the reverse direction. In one embodiment, the voltage reduction module 110 comprises a DC to DC converter or regulator with an associated pulse-width modulator. In a further embodiment, the voltage reduction module 110 is a pulse-width-modulated buck converter. The voltage reduction module 110, in one embodiment, provides the switching voltage to the switching module 108 when the input current is flowing in the forward direction. The switching voltage, in one embodiment, is configured to cause the switching module 108 to close a switch. In a further embodiment, the switching voltage comprises a coil voltage that is sufficient to cause a relay coil in the switching module 108 to close a relay switch.

In one embodiment, the voltage reduction module 110 senses input current flow and/or direction and starts a pulse-width modulated signal in the DC-to-DC converter's pulse-width modulator in response to detecting current flowing in a positive direction. In another embodiment, the voltage reduction module 110 draws enough current when the input current is flowing in a positive direction to operate the pulse-width modulator and DC-to-DC converter and has insufficient current to operate the pulse-width modulator and DC-to-DC converter when the input current is flowing in the negative direction or is not flowing, either due to no voltage from the electric source 102 or a reversed voltage from the electric source 102.

In one embodiment, the short circuit protection module 112 is configured to cause the switch of the switching module 108 to open in response to an electrical short or failure within the switching power supply 114. In another embodiment, the short circuit protection module 112 receives a signal from the switching power supply 114 in response to an electrical short or failure in the switching power supply 114. The voltage reduction module 110 may open a switch interrupting the switching voltage from reaching the switching module 108, may stop the voltage reduction module 110 from converting the input voltage to the switching voltage, may prevent the input current from reaching the voltage reduction module 110, or may otherwise cause the switch of the switching module 108 to open in response to a short circuit in the switching power supply 114.

In one embodiment, the short circuit protection module 112 comprises a control for the pulse-width modulator in the voltage reduction module 110. The control shuts off a pulse-modulated signal in the voltage reduction module 110 when the short circuit protection module 112 detects a short circuit or other failure in the switching power supply 114. In a further embodiment, the short circuit protection module 112 may control the level of the switching voltage by varying the pulse-width of a pulse-width modulated signal. In another embodiment, the short circuit protection module 112 may provide a pulse-width modulated signal to the switching power supply 114 to control the voltage level at the output 116 of the switching power supply 114.

In one embodiment, the switching power supply 114 converts an input voltage to an output voltage. The switching power supply 114, in one embodiment, comprises a DC to DC converter or regulator. The switching power supply 114 may, in one embodiment, comprise a switching regulator. The switching power supply 114, in certain embodiments, may be referred to as a switched-mode power supply or a switching-mode power supply (SMPS). The switching power supply 114, in one embodiment, may maintain a substantially constant output voltage at the output 116 by turning one or more switches on and off based on a pulse-width modulated signal, and may include other switching power supply components such as inductors, capacitors, transformers, etc.

In one embodiment, the output 116 provides electric power at a regulated output voltage from the switching power supply 114 to an electric load. The electric load may comprise electric equipment or hardware such as computer equipment, telecommunications equipment, or the like. In one embodiment, the switching power supply 114 may comprise a buck type, boost type, buck-boost type, flyback type, half-forward type, forward type, push-pull type, half-bridge type, full-bridge type, resonant type, cuk type, inverting charge-pump type, single ended primary inductor converter (SEPIC) type, charge pump type, or other switching power supply topology.

In one embodiment, the switching power supply 114 receives a pulse-width modulated signal or other control signal from the short circuit protection module 112. In a further embodiment, the switching power supply 114 sends one or more signals to the short circuit protection module 112. The one or more signals may comprise an output voltage feedback signal, a short circuit signal, or other operational or safety signals. The switching power supply 114, in one embodiment, is configured to detect an electrical short circuit in one or more switches within the switching power supply 114, such as a switching transistor or the like. The switching power supply 114 may employ analog or digital circuitry to detect the electrical short circuit.

Figure 2:
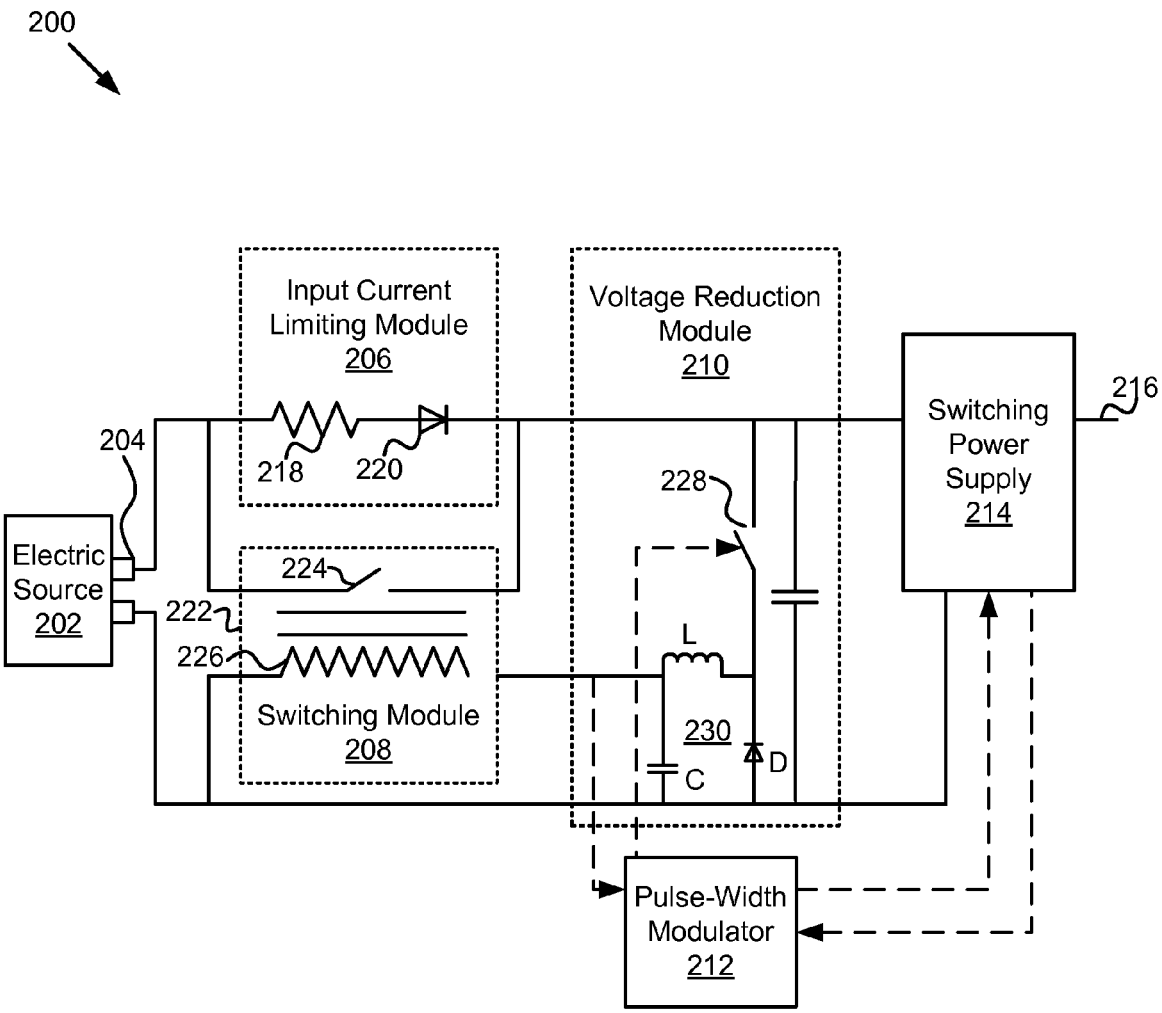
FIG. 2 is a schematic block diagram illustrating another embodiment of a system for providing lossless reverse voltage protection to a power supply in accordance with the present invention.

FIG. 2 illustrates one embodiment of a system 200 for providing lossless reverse voltage protection to a power supply 214. The system 200 may be substantially similar to the system 100 of FIG. 1. In one embodiment, the system 200 comprises an electric source 202, an electrical connector 204, an input current limiting module 206, a switching module 208, a voltage reduction module 210, a pulse-width modulator 212, a switching power supply 214, and an output 216.

In one embodiment, the electric source 202 is substantially similar to the electric source 102 of FIG. 1. In another embodiment, the electric source 202 comprises a battery having a voltage greater than about 40 V, for example plus or minus 44 V, or plus or minus 48 V. In a further embodiment, the electric source 202 comprises a battery for use with telecommunications equipment. In one embodiment the electrical connector 204 is substantially similar to the electrical connector 104 of FIG. 1, and the electrical connector 204 receives an input current from the electric source 202.

In one embodiment, the input current limiting module 206 is substantially similar to the input current limiting module 106 of FIG. 1, preventing the input current from the electrical connector 204 from reaching the switching power supply 214 when the input current is flowing in a reverse direction. In one embodiment, the input current limiting module 206 comprises a resistor 218 and a diode 220.

In one embodiment, the resistor 218 provides a higher impedance to the input current than does the switching module 208 when the switching module 208 is in a closed state. In a further embodiment, the resistor 218 provides enough impedance to the input current to prevent overheating, smoking, fires, and the like of the system 200 when the switching module 208 is in an open state in response to a short circuit or the like in the switching power supply 214. In another embodiment, the resistor 218 has a high enough wattage rating that the resistor 218 does not overheat when the switching module 208 is in an open state. In one embodiment, the diode 220 is configured to prevent the input current from reaching the switching power supply 214 when the input current is flowing in a reverse direction. In one embodiment, the diode 220 is electrically coupled to the resistor 218 in a series configuration. In a further embodiment, the resistor 218 has a resistance that is high enough that the diode 220 may comprise a low power diode. In another embodiment, the diode 220 and the resistor 218 are configured in parallel. In another embodiment, the resistor 218 and the diode 220 are configured in series and another resistor is in parallel with the diode 220 or the diode 220 and the resistor 218.

In one embodiment, the switching module 208 is substantially similar to the switching module 108 of FIG. 1, closing a switch 224 in response to the voltage reduction module 210 providing a switching voltage. In one embodiment, the switching module 208 comprises a relay 222, the relay comprising the switch 224 and a coil 226. The relay 222, in one embodiment, may comprise a high current DC powered relay. In one embodiment, the coil 226 receives a switching voltage or coil voltage from the voltage reduction module 210 when the input current is flowing in a forward direction, and the coil 226 closes the switch 224 in response to the switching voltage. In a preferred embodiment, the switch 224 of the relay 222 has a substantially lower impedance than the resistor 218 and the diode 220 when the switch 224 is closed.

In one embodiment, the voltage reduction module 210 is substantially similar to the voltage reduction module 110 of FIG. 1, reducing an input voltage of the switching power supply 214 to a switching voltage or coil voltage when the input current is flowing in the forward direction, and directing the switching voltage to the switching module 208. In a further embodiment, the voltage reduction module 210 comprises a switch 228 that is part of a buck converter 230. The buck converter 230, in one embodiment, includes the switch 228, a diode D, an inductor L, and a capacitor C. The switch 228, in one embodiment, may comprise a transistor, such as a field-effect transistor (FET), a bipolar junction transistor (BJT), or another type of switch that is capable of being operated in response to a pulse-width modulated signal.

In one embodiment, the voltage reduction module 210 includes the pulse-width modulator 212. In another embodiment, the switch 228 receives a pulse-width modulated signal from the pulse-width modulator 212 that controls the switching power supply 214. The switch 228 opens and closes based on the pulse-width modulated signal. The opening and closing of the switch 228, in one embodiment, causes the buck converter 230 to alternate between connecting the inductor L to the switching voltage to store energy in the inductor L and discharging the inductor L into the switching module 208. In one embodiment, the buck converter 230 runs open loop with a fixed pulse width. In another embodiment, the buck converter 230 receives a feedback signal from the capacitor C in the form of the switching voltage or similar voltage. The feedback signal may then be used to control a pulse width of a portion of the pulse-width modulator 212 that controls the buck converter 230.

In one embodiment, the pulse-width modulator 212 is substantially similar to the short circuit protection module 112 of FIG. 1, causing the switch 224 to open in response to an electrical short within the switching power supply 214. The pulse-width modulator 212 may be part of a processor or other controller. The pulse-width modulator 212 may, in one embodiment, provide one or more pulse-width modulated signals to the voltage reduction module 210 and/or the switching power supply 214. In one embodiment, the pulse-width modulator 212 receives one or more feedback signals from other modules such as the voltage reduction module 210 and the switching power supply 214. The feedback signals may communicate voltages, currents, safety information, system states, or the like.

In one embodiment, the pulse-width modulator 212 is configured to determine the pulse-width of the one or more pulse-width modulated signals based on the one or more feedback signals. The pulse-width modulator 212, in one embodiment, may cause the relay switch 224 to open by opening the buck converter switch 228 in response to a short circuit signal or another safety signal from the switching power supply 214. The switching power supply 214 and the output 216, in one embodiment, are substantially similar to the switching power supply 114 and the output 116 of FIG. 1.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for preventing reverse current in a switching power supply, the apparatus comprising:
   an electrical connector configured to receive an input current from an electric source;
   an input current limiting module configured to substantially prevent the input current from reaching a switching power supply when the input current is flowing in a reverse direction;
   a voltage reduction module configured to reduce an input voltage of the switching power supply to a switching voltage when the input current is flowing in a forward direction; and
   a switching module configured to close a switch in response to the voltage reduction module providing the switching voltage, wherein the switch provides the input current a lower impedance path to the switching power supply than does the input current limiting module.

2. The apparatus of claim 1, wherein the input current limiting module limits the input current to the switching power supply when the input current is flowing in a forward direction.

3. The apparatus of claim 2, wherein the input current limiting module comprises a resistor and a diode.

4. The apparatus of claim 3, wherein the switching module comprises a relay and the switching voltage controls the relay.

5. The apparatus of claim 4, wherein the voltage reduction module comprises a buck converter that receives the input voltage and supplies the switching voltage to the switching module and wherein the switching voltage is lower than the input voltage.

6. The apparatus of claim 5, further comprising a short circuit protection module configured to open the switch in response to an electrical short within the switching power supply.

7. An apparatus for preventing reverse current in a switching power supply, the apparatus comprising:
- an electrical connector configured to receive an input current from an electric source;
- an input current limiting module electrically coupled to the electrical connector, the input current limiting module configured to prevent the input current from reaching a switching power supply when the input current is flowing in a reverse direction;
- a buck converter configured to reduce an input voltage of the switching power supply to a coil voltage when the input current is flowing in a forward direction; and
- a relay with a switch electrically coupled to the electrical connector and to the switching power supply, the switch of the relay connected in a parallel configuration with the input current limiting module, the relay configured to close the switch of the relay in response to the voltage reduction module providing the coil voltage, wherein the relay provides the input current a lower impedance path to the switching power supply than does the input current limiting module.

8. The apparatus of claim 7, further comprising a short circuit protection module configured to prevent the buck converter from providing the coil voltage in response to an electrical short within the switching power supply.

9. The apparatus of claim 7, wherein the input current limiting module comprises a resistor and a diode, a first connection of the resistor connected to the electrical connector and to a first connection of the switch of the relay and a second connection of the resistor connected to an anode of the diode, a cathode of the diode connected to the switching power supply and to a second connection of the switch of the relay.

* * * * *